(No Model.)

C. WARNER.
ANIMAL TRAP.

No. 377,589. Patented Feb. 7, 1888.

Witnesses.

Charles Warner, Inventor
By atty.

UNITED STATES PATENT OFFICE.

CHARLES WARNER, OF WATERTOWN, CONNECTICUT.

ANIMAL-TRAP.

SPECIFICATION forming part of Letters Patent No. 377,589, dated February 7, 1888.

Application filed December 13, 1887. Serial No. 257,752. (No model.)

*To all whom it may concern:*

Be it known that I, CHARLES WARNER, of Watertown, in the county of Litchfield and State of Connecticut, have invented a new Improvement in Animal-Traps; and I do hereby declare the following, when taken in connection with accompanying drawings and the letters of reference marked thereon, to be a full, clear, and exact description of the same, and which said drawings constitute part of this specification, and represent, in—

Figure 1:
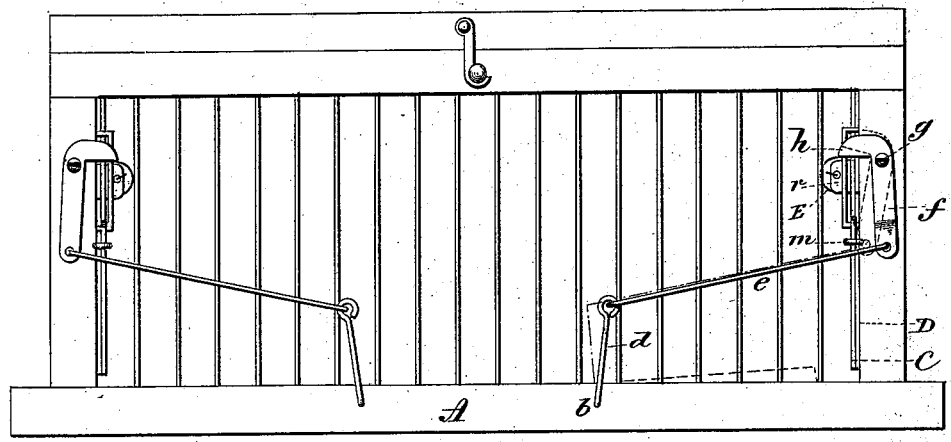
Figure 2:
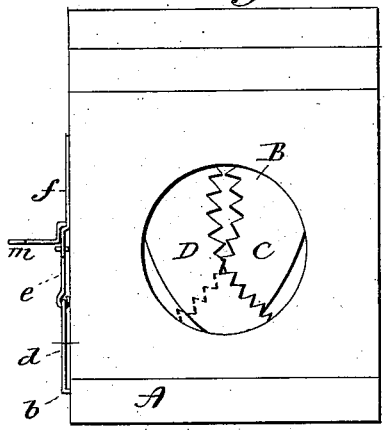
Figure 3:
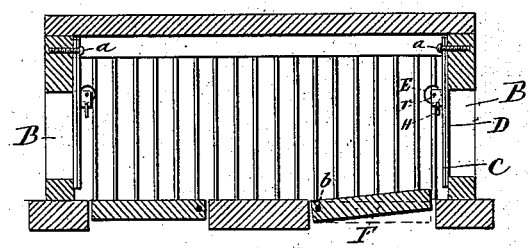
Figure 4:
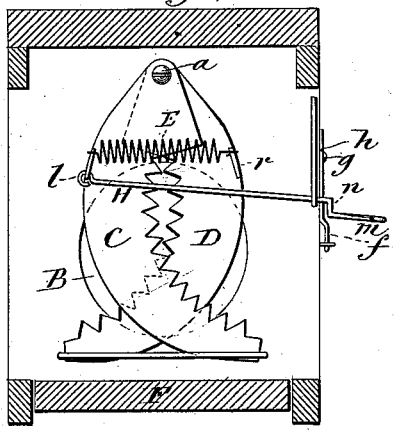
Figure 5:
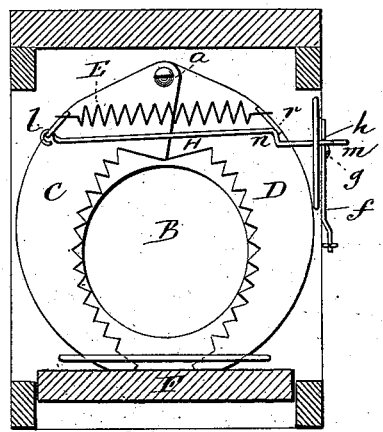

Figure 1, a side view; Fig. 2, an end view; Fig. 3, a longitudinal central section; Fig. 4, a transverse section showing inside view of one end with the jaws in the closed position; Fig. 5, the same section as Fig. 4, showing the jaws in the open or set position.

This invention relates to an improvement in that class of traps which are of a box or cage like character, having an entrance at one or both ends through which the animal may enter, and the entrance provided with a device held in suspension while the trap is open, but tripped by the action of the animal entering the trap, so that the opening will be automatically closed to prevent escape from the trap, the object of the invention being a simple device for closing the opening, and which may at the same time be adapted to grasp and hold the animal should entrance not be fully made or exit attempted; and it consists in a cage or box having an opening for the entrance of the animal, a portion of the floor hung upon a pivot, a pair of spring-jaws hung to swing in the plane of the opening, and a trip arranged to hold the jaws in the open condition, so as to leave the inlet-passage free, and the said trip in connection with the said pivoted portion of the floor, so that the pressure of the animal upon the floor will cause the jaws to be released and close the opening, the jaws approaching each other in closing, so as to form a bite upon the animal if within their grasp.

I represent the trap as of cage form, which will be sufficient for the illustration of the invention.

A represents the bottom of the trap, the sides of which are represented as of wire-work. Through one or both ends an opening, B, is formed, through which the animal may enter the trap. This opening is preferably round, as represented.

C D represent two jaws, which are made from thin metal, and are preferably hung upon the inside of the end, pivoted above the opening, as at *a*, and so as to swing in a plane parallel with the plane of the opening, as from the closed position in Fig. 4 to the open position seen in Fig. 5. The adjacent edges of the jaws are preferably toothed, so as to make a more secure bite when occasion requires. A spring, E, is arranged between the jaws, the tendency of which is to draw them to and hold them in the closed position, but so as to yield for the jaws to be opened, as seen in Fig. 5.

A portion, F, of the floor is pivoted at one end, as at *b*, and extending from the pivot toward the opening, the other end free, so that the part F of the floor forms a platform which may swing up and down to a limited extent.

From the pivot *b* an arm, *d*, extends upward, preferably outside the trap, and from this arm a rod, *e*, connects it with a trip, *f*, which is hung at the side of the frame upon a pivot, *g*. This trip is constructed with a nose, *h*, which extends into a plane inside the plane of the jaws.

H represents the setting-bar. This bar is hung to one jaw, C, as at *l*, and extends across and out through the opposite side of the trap, and so that its end *m* will stand beneath the nose *h* of the trip. The bar is constructed with a shoulder, *n*, and the jaw D with a corresponding catch, *r*, so that when the jaws are in the open position the shoulder *n* will engage the catch *r* and serve to hold the jaws in their open condition. The end *m* of the bar stands beneath the nose *h* of the trip and holds the trip in the suspended condition, as indicated in broken lines, Fig. 1. This position of the trip causes the free end of the platform to rise, as represented in Fig. 3. In this condition the trap is set. If an animal enter and step upon the platform F, his weight will tend to depress the platform, and this action will cause the trip *f* to turn and force the nose *h* downward, which will act upon the setting-bar H and force its shoulder *n* out of engagement with the catch *r*, and thus leave the jaws free for the reaction of the spring, which will cause the jaws to instantly fly into the closed position, as represented in Fig. 4, and cut off retreat. If the animal has not fully passed into the trap, and as will usually be the case, the jaws will grasp him with so firm a bite as to hold him, if not to destroy life.

The cage or body of the trap serves as a means for bait to entice the animal to enter through the opening.

The trap may be constructed with a like opening and jaws at both ends, as represented in Fig. 3, so that the trap may appear to offer a free passage through it; but an attempt to pass through it from either direction, or to escape from it if in the trap, necessarily brings the animal upon the platform to give it a depression, which must unavoidably cause the opening into or from the trap to be closed.

I prefer to make the edges of the jaws serrated, because it makes a firmer bite than smooth jaws; but it will be understood the serrations may be omitted.

I claim—

The herein-described improvement in animal-traps, consisting of a box or cage having one or more openings into it, a platform pivoted in the floor, a pair of spring-jaws hung to swing in a plane across the opening and parallel therewith, a setting-bar hung to one jaw and constructed with a shoulder, the other jaw constructed with a catch to engage said shoulder when in the set position, and a trip hung to the body of the trap and in connection with said pivoted platform and adapted to disengage the setting-bar, substantially as described.

CHARLES WARNER.

Witnesses:
  LEMAN W. CUTLER,
  MARY S. CUTLER.